Jan. 27, 1942.  F. F. C. RIPPON  2,270,896
RECORD SELECTING AND PRESENTING DEVICE
Filed July 14, 1937   8 Sheets-Sheet 1

INVENTOR
F. F. C. Rippon
BY
John W. Hoag.
ATTORNEY

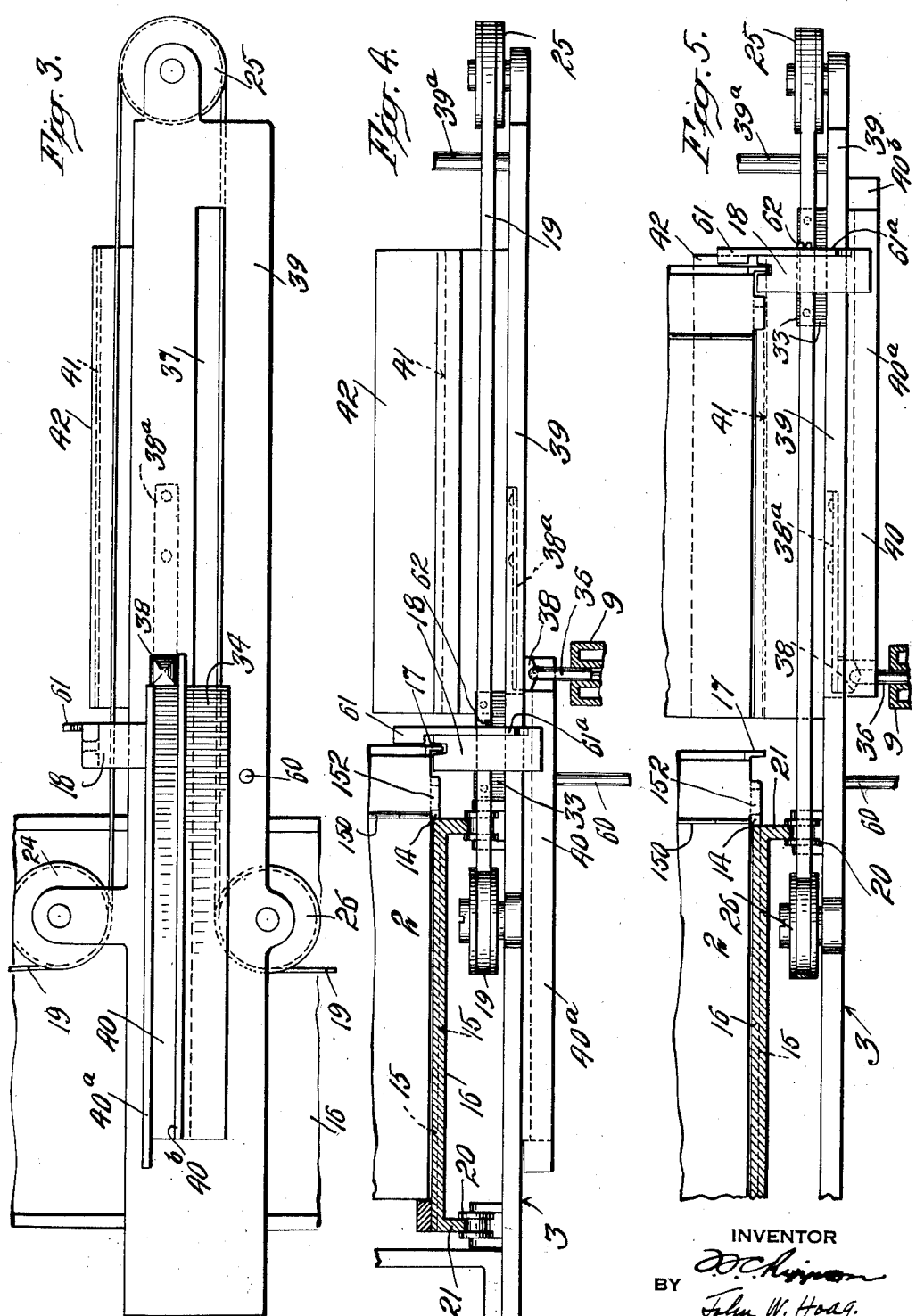

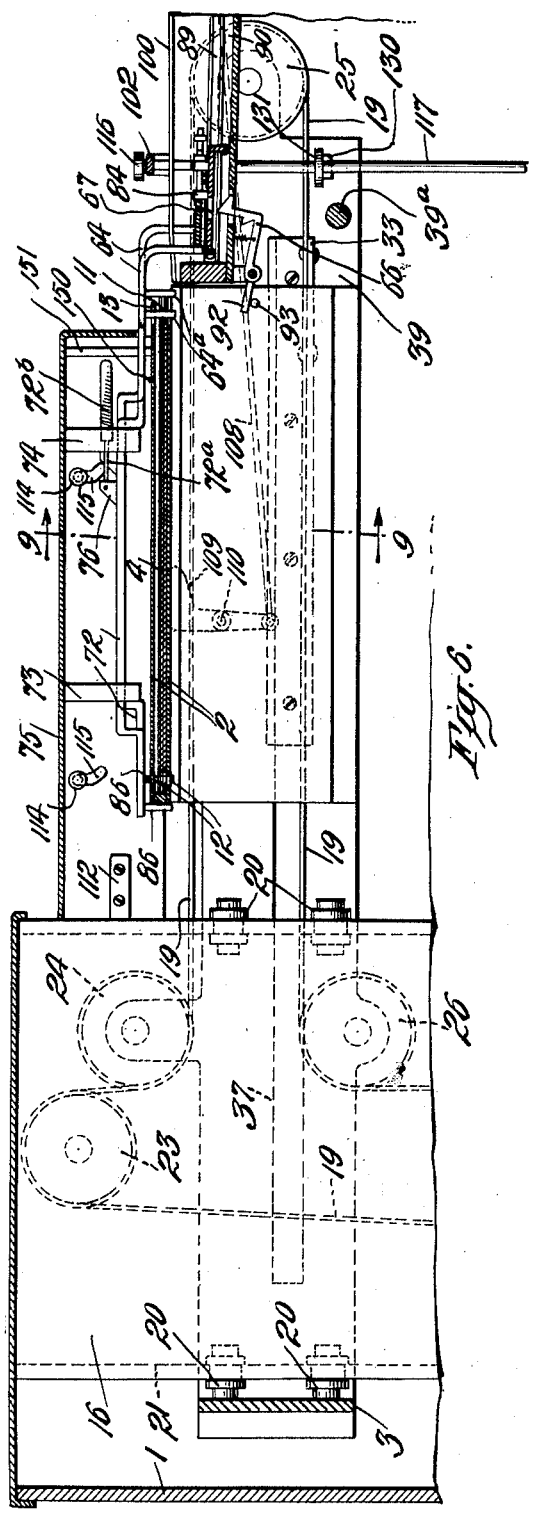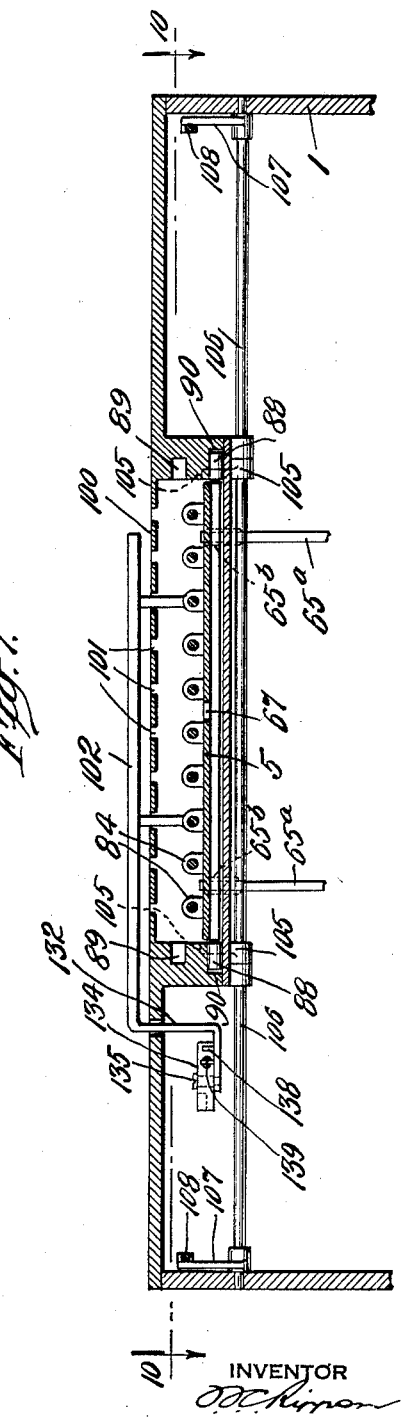

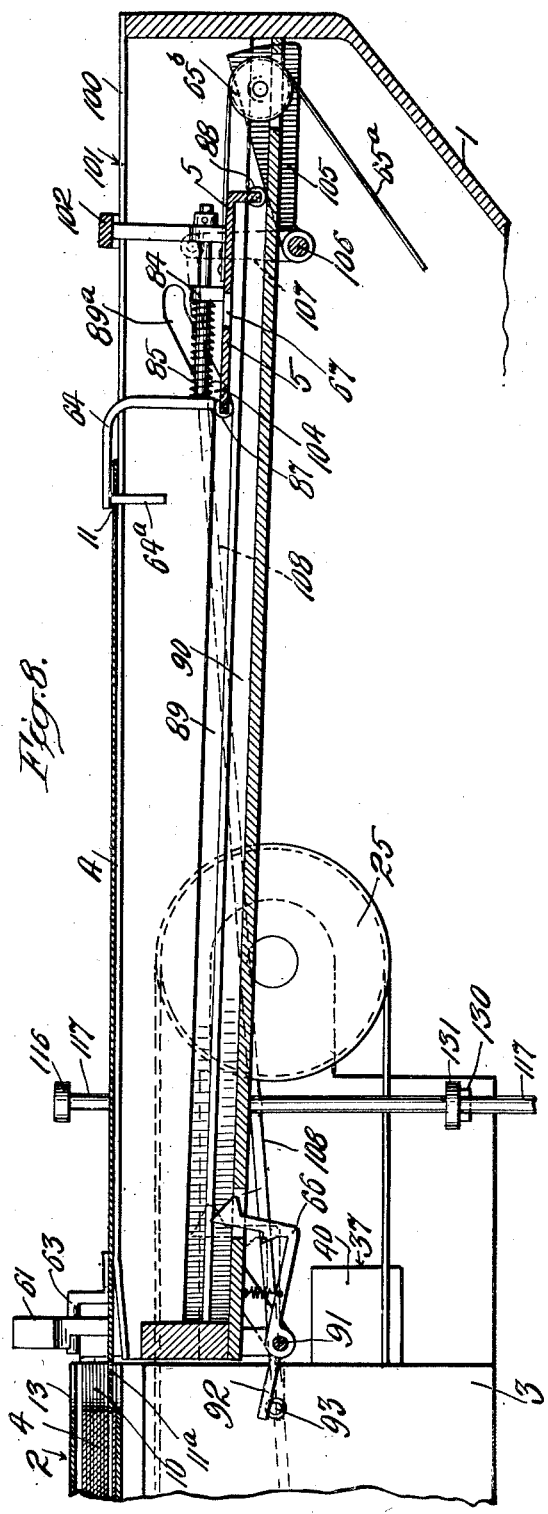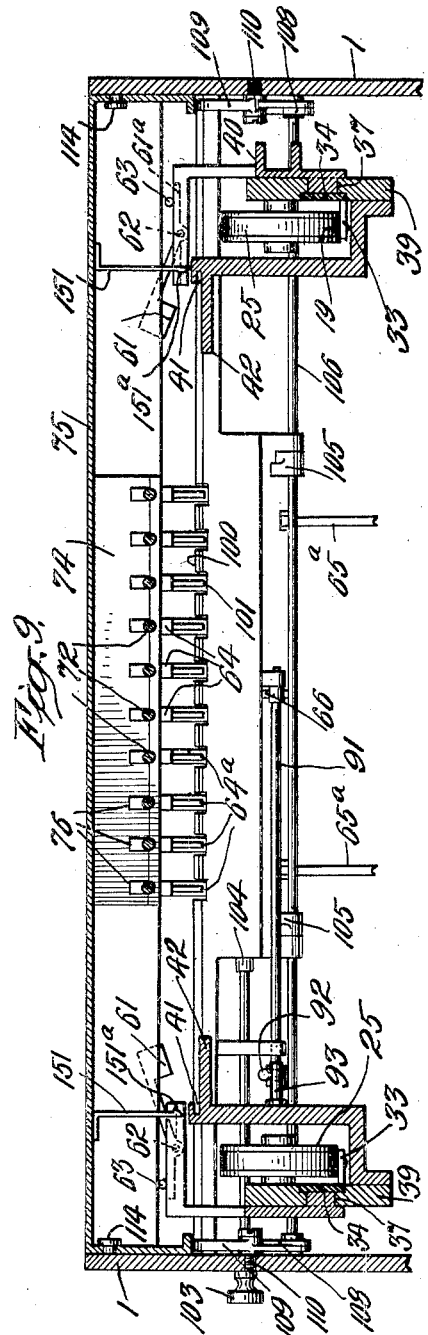

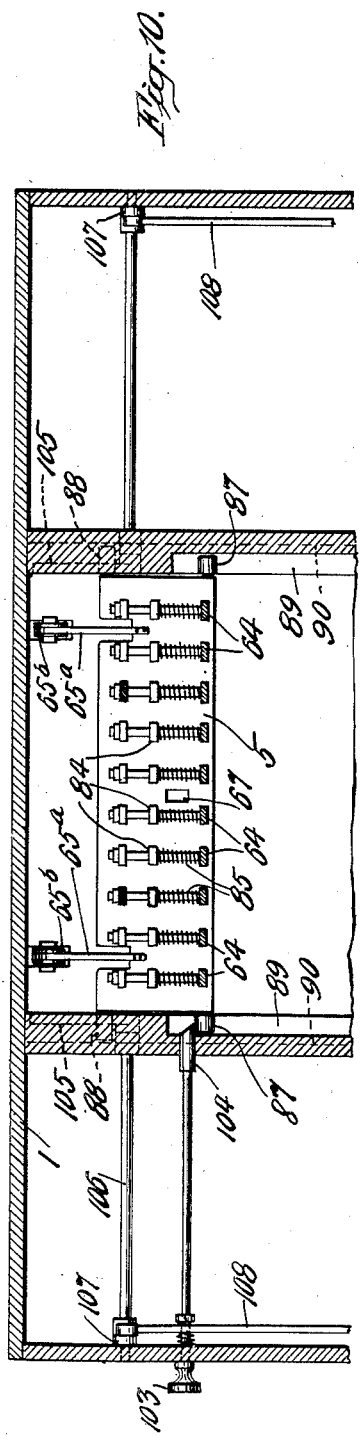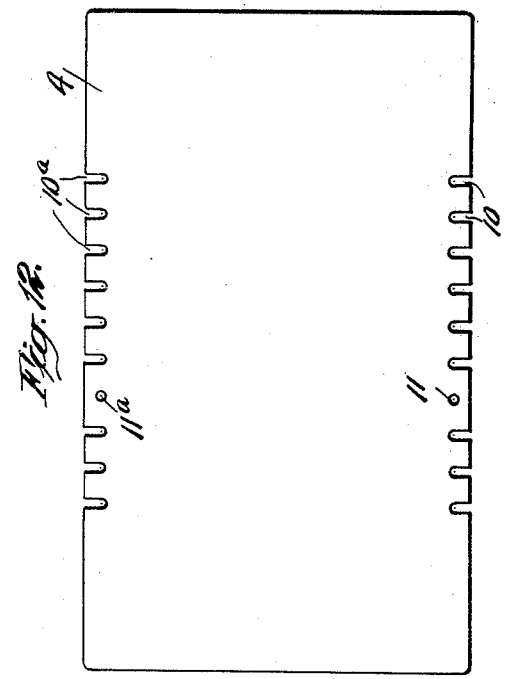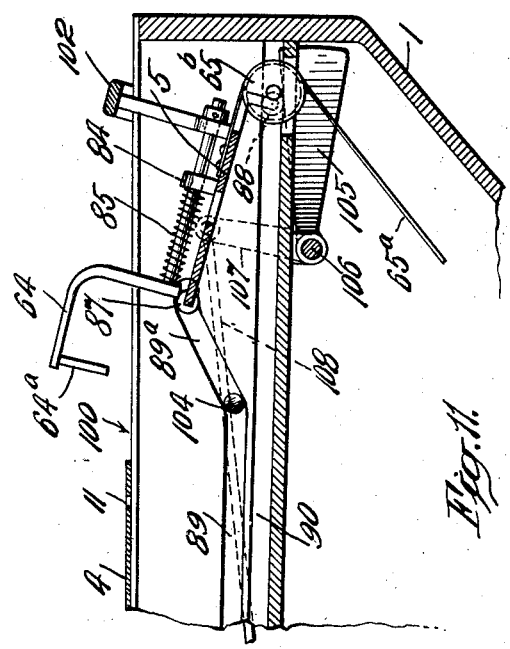

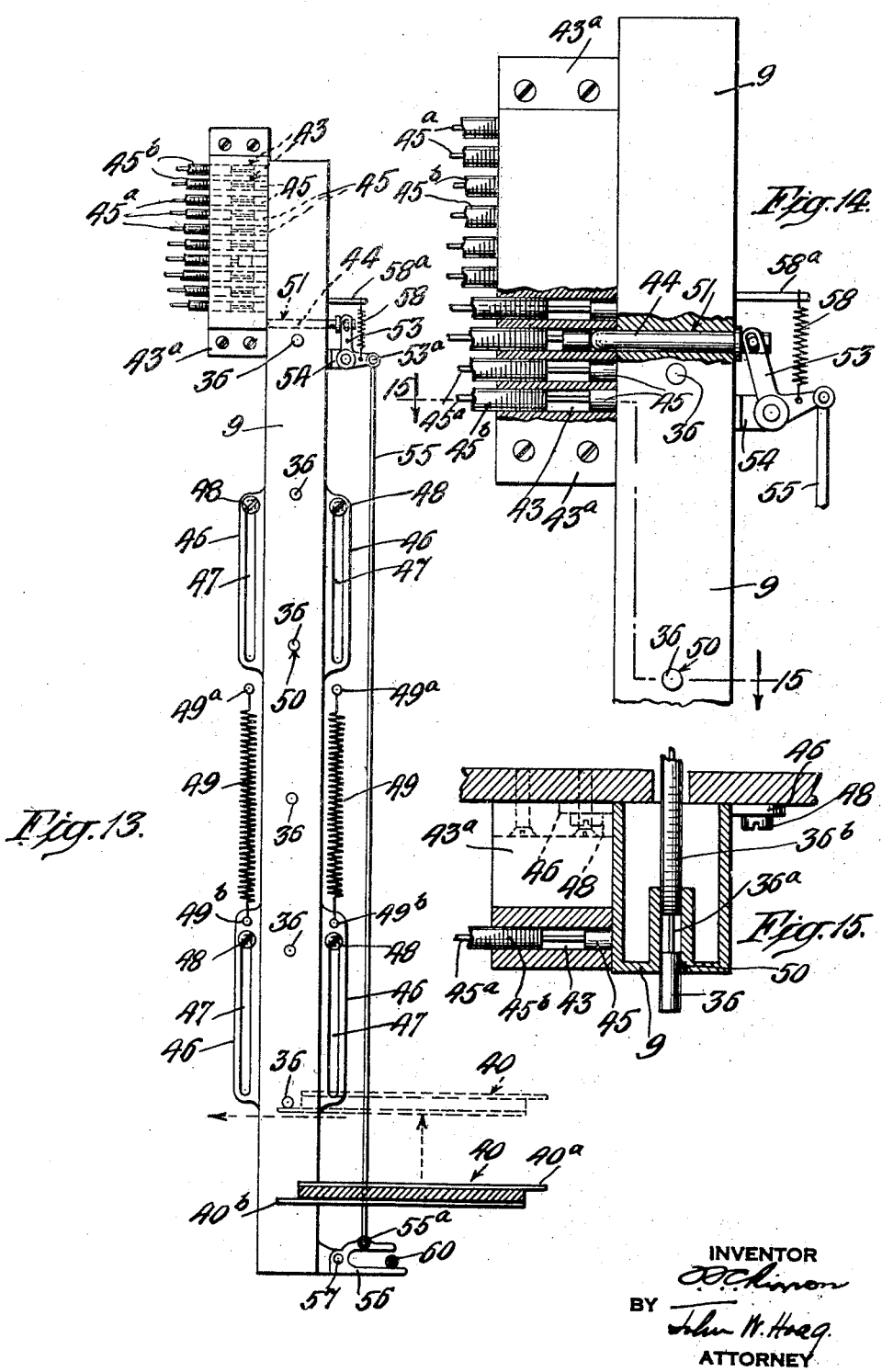

Jan. 27, 1942.   F. F. C. RIPPON   2,270,896
RECORD SELECTING AND PRESENTING DEVICE
Filed July 14, 1937   8 Sheets-Sheet 8
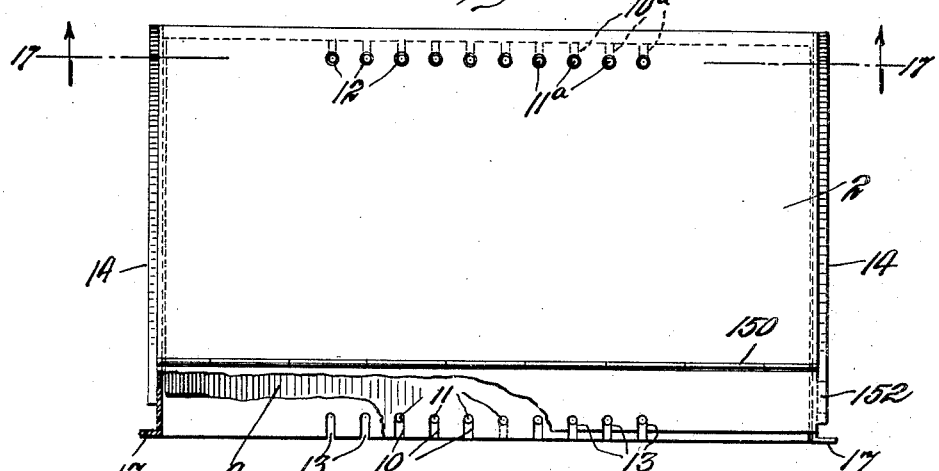
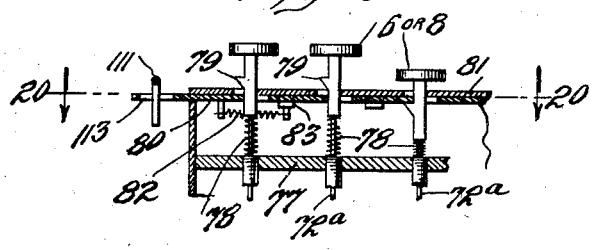
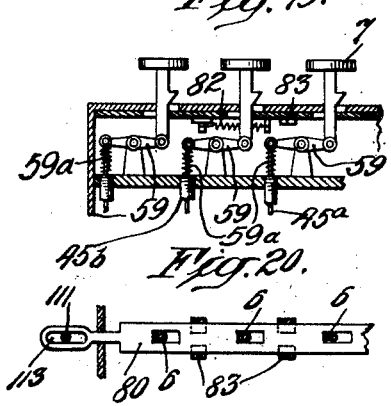
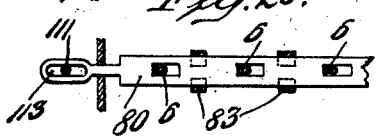
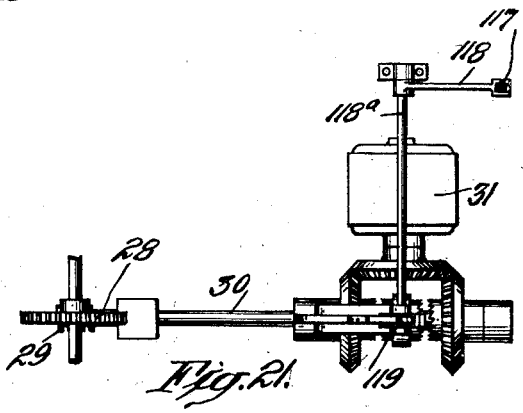

Patented Jan. 27, 1942

2,270,896

UNITED STATES PATENT OFFICE 2,270,896

RECORD SELECTING AND PRESENTING DEVICE

Francis Felix Claude Rippon, New York, N. Y.

Application July 14, 1937, Serial No. 153,682

32 Claims. (Cl. 129—16.1)

This invention relates to a card record storage and filing device having means for mechanically selecting a desired record and presenting it in convenient position for the operator to take data therefrom or make entries thereon, and thereafter returning it to its original position in the file.

Heretofore devices have been suggested for automatically selecting a desired record and raising it above the adjacent records in a single storage unit so that the operator can grasp it and pull it out. Means have also been suggested for separating record cards to expose a desired card selected from more than one container. In United States Patents No. 1,683,491 and No. 1,739,651 granted to me on September 4, 1928, and December 17, 1929, support means are shown for a number of records together with means for selecting and presenting to the operator the portion of said support means bearing a desired record. So far as I know my device disclosed herein is the first to not only select a desired record card from a large number of separate storage units, but also to withdraw each selected card to the same station where all its data may be readily seen, or an entry may be conveniently made by the operator, without requiring that the operator take hold of the card, withdraw it by hand, and thereafter return it to its original position by hand.

Similarly I believe the device is the first whereby the record card may be mechanically returned to its particular storage unit and the unit returned to its original position in the cabinet without any manual operation on the part of the operator other than to push a lever or operate a control key.

In carrying out my invention I provide a cabinet in which a number of storage units are contained. Each of the storage units is adapted to receive a predetermined number of serially identified record cards, and I provide means whereby on the operation of control keys identifying the particular record card desired, the storage unit containing the desired record card will be moved out of its place and brought to a predetermined position where the desired card is drawn out of its storage unit into position to be readily observed, or to have a notation made thereon. Means are also provided whereby the card may if desired be mechanically withdrawn entirely and freed from its container, as for example, to permit the substitution of a new card.

Means are also provided whereby upon actuation of a control means the withdrawn card may be returned to its place in its particular storage unit and the unit returned to its original position in the cabinet.

While for the purpose of a full disclosure I have herein described one embodiment of my invention in detail, it will be understood that the form, number and arrangement of parts employed herein may be widely varied without departing from the scope of the invention.

The invention will best be understood if the following description is read in connection with the accompanying drawings in which:

Figure 3 is a side view of the storage unit carriage;

Figure 4 is a top view showing the carriage in one position;

Figure 5 is a view similar to Figure 4 showing the carriage in another position;

Figure 6 is a side elevation, partly broken away, of the upper portion of the device, showing the storage unit carriage raised to top position and a card in position to be pulled out;

Figure 7 is a transverse vertical section taken on the line 7—7 of Figure 1;

Figure 8 is a side elevation of a front portion of the upper part of the device showing the card selector carriage near rear position;

Figure 9 is a transverse vertical section taken on the line 9—9 of Figure 6;

Figure 10 is a detail horizontal section on the line 10—10 of Figure 7;

Figure 11 is a detail, enlarged view of the card selector carriage in extreme forward position after pulling a card entirely out of the storage unit;

Figure 12 is a plan view of one of the record cards;

Figure 13 is a vertical section on the line 12—12 of Figure 1 showing the vertically moveable panel supporting part of the tens and hundreds digit control means;

Figure 14 is an enlarged detail of the upper portion of the panel shown in Figure 13, including the tens digit selecting means;

Figure 15 is a section taken on the lines 15—15 of Figure 14;

Figure 16 is a plan view of one of the card storage units partly cut away to show one or more cars in the unit and the bottom of the unit;

Figure 17 is a view taken on the line 17—17 of Figure 16;

Figure 18 is a detail view illustrating the keys for controlling the means for selecting the desired "units" and "hundreds" digits;

Figure 19 is a detail of keys for controlling the means for selecting the "tens" digits;

Figure 20 is a detail view taken on line 20—20 of Figure 18, showing the slide by which the control keys may be released;

Figure 21 is a top view of a motor and clutch connections for driving and reversing the driving members of the device;

Figure 22 is a detail view taken on the line 22—22 of Figure 1; and

Figure 23 is a detail view taken on the line 23—23 of Figure 22.

General assembly

Figure 1:
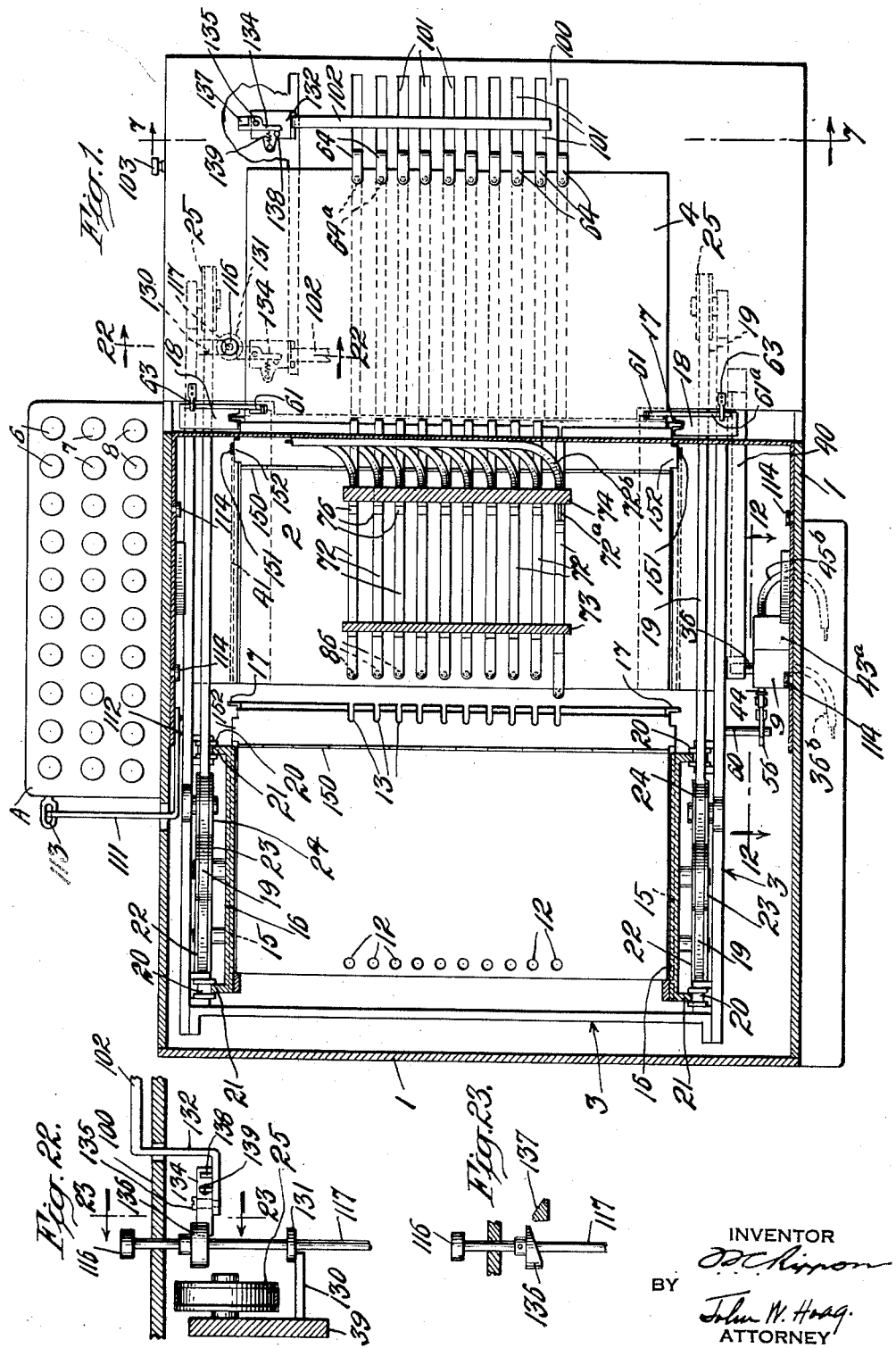
Figure 1 is a top elevation partly in section.
Figure 2:
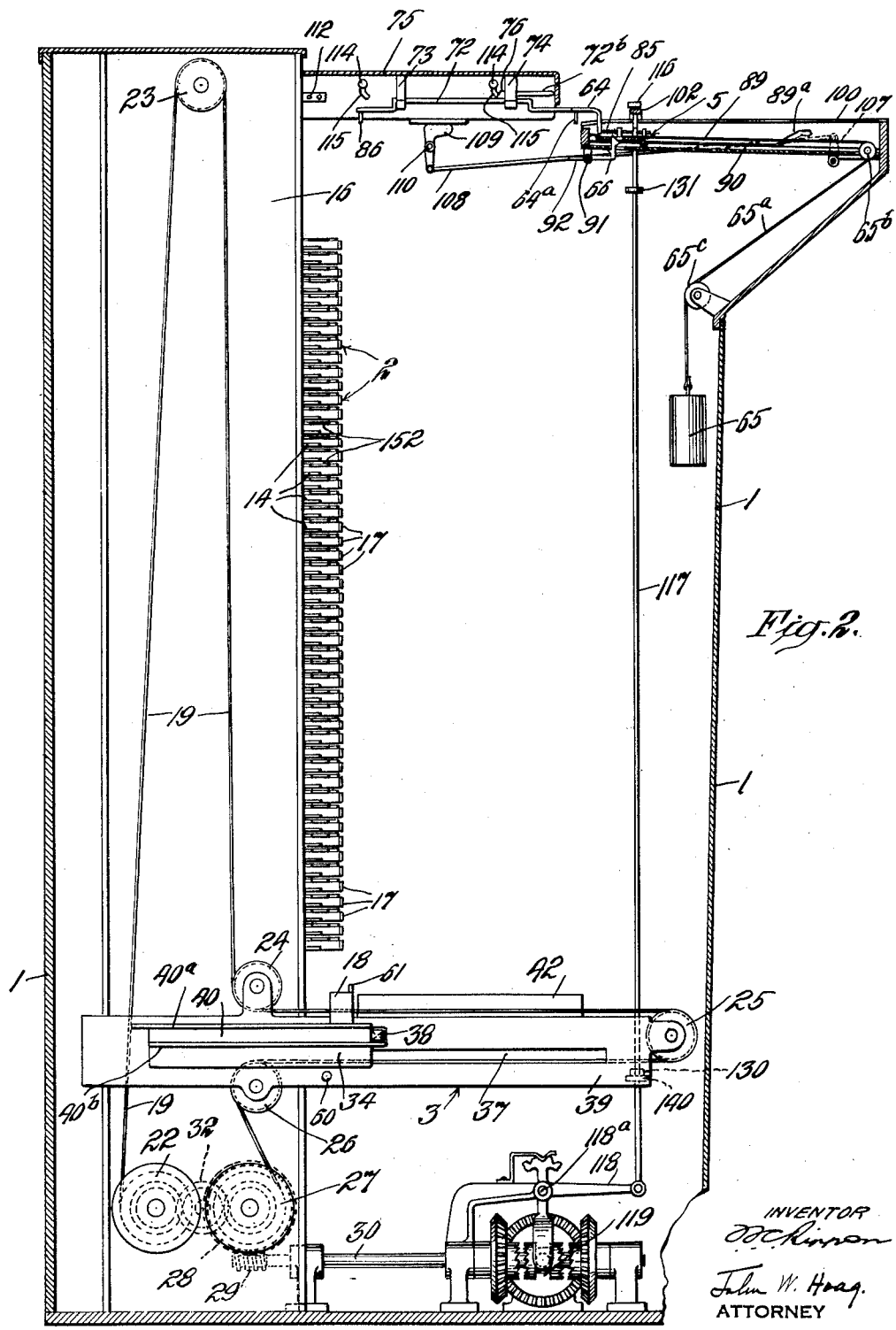
Figure 2 is a side elevation also partly in section.

As illustrated herein the device comprises a casing 1 for storing serially numbered record cards, containing a number of record storage units 2 shown arranged in a vertical column, an elevator or carriage member 3 by which a storage unit containing a desired card 4 may be moved out of its place and raised to the top of the cabinet; a card selecting slide 5 which, when a storage unit is raised to the top of the cabinet has a finger in position to engage the desired card contained within the storage unit, and immediately after such engagement moves away from the storage unit thus withdrawing the desired card; similar finger members supported in the top of the casing adapted to engage with apertures along the rear edge of each of the other cards (those which are not to be withdrawn) to retain them in place and prevent their movement due to friction while the desired card is being withdrawn; and a key-board A comprising sets of keys 6, 7 and 8 representing respectively units, tens and hundreds digits, corresponding to the range of numbers of said record cards, the units digits control keys having connections to the rods which engage the cards within the storage unit when the storage unit rises to its top position, and the tens and hundreds keys having connections to means, including a panel 9 moveable in a vertical plane, by which the storage unit containing the desired card is selected.

Record cards

The record cards 4 as shown in Figure 12, are substantially rectangular in shape and along both their front and rear margins are provided with nine recesses or cut-outs, identified respectively as 10 and 10a extending inwardly from the edge of the card and one hole identified as 11 for the front margin and 11a for the rear margin, spaced from the edge of the card to engage a finger insertable therein. The position of the holes 11 and 11a relative to the recesses 10 and 10a is different on each of the ten cards adapted to be contained in each storage unit. When all ten cards are in place within a storage unit one aperture 11 or 11a will be in vertical alinement with nine marginal recesses 10 and 10a respectively. The fingers (to be described) which are adapted to retain nine cards within a storage unit while the tenth and desired card is withdrawn may therefore positively engage the apertures 11a of nine cards without preventing the withdrawal of the tenth, desired, card. Similarly a selected finger may engage the aperture 11 in the front margin of the desired card and withdraw it from its storage unit without positively engaging or withdrawing any of the other nine cards.

Storage unit

As illustrated herein the storage units 2 are rectangular boxes open at the front end and adapted to receive the record cards 4 which are of a size to fit snugly within the storage unit. Along the rear edge of the unit but spaced therefrom, ten holes 12 are provided positioned in vertical alinement with the nine recesses 10a and one aperture 11a of the cards, to permit entry into the unit of nine retaining fingers which respectively engage the holes 11a of the nine cards which are not to be withdrawn from the unit.

Along the front edges of the unit 2 ten marginal recesses 13 are provided also vertically alined with the recesses 10 and aperture 11 of the cards, to permit a selected finger to register with and enter the aperture 11 in the desired card to be withdrawn.

Each storage unit is provided with laterally extending flanges 14 which engage horizontal slots 15 in the supporting rack frame 16. Also extending laterally from the sides of each unit are the vertically extending flanges or tabs 17 preferably positioned at the front end of the unit 2 to be engaged by bifurcated members 18 carried by the storage unit selecting carriage 3, by which the storage unit is moved from its place and elevated to a position where the desired card is withdrawn. If desired the front portion of the top of a storage unit may be hinged as at 150 to facilitate placing a card in the unit by hand, as will be described.

Storage unit selecting carriage

The carriage member 3 is moveably supported within the cabinet 1 and is adapted to engage with the particular unit 2 containing a desired record and to move it out of its place to a predetermined position where the desired card is withdrawn. The carriage 3 is fixed to and moveable with a pair of belts 19 and is provided with rollers 20 which travel along the tracks 21 formed by the edges of the angle members comprising rack 16. Each belt 19 is fastened at one end to a pulley 22 rotatably mounted near the bottom of the casing 1; passes over a pulley 23 mounted near the top of the cabinet, and over the idlers 24, 25 and 26 supported on the carriage 3, and is fastened at its other end to a pulley 27 fixed near the bottom of the cabinet, adjacent pulley 22. A gear member 28 is attached to pulley shaft connecting the two pulleys 27 and is adapted to be actuated by a worm gear 29 on the shaft 30 driven by the motor 31. Any suitable means may be used for engaging, disconnecting or reversing the motor, but as illustrated herein a well known clutch mechanism is employed connected to control means to be described. Interconnecting the pulley members 22 and 27 is an idler 32 which serves to cause these two pulleys to rotate in synchronism.

When the drive shaft 30 is actuated the belt 19 is caused to move from pulley 22 to pulley 27. Each belt 19 is fixed at 33 to a slide 34 on the carriage 3, and the carriage 3 therefore moves upwardly until it is stopped by contact with one of a number of stops 36 (see Fig. 13) actuated by the "hundreds" digits control keys, as described below. The slide members 34 supported in horizontal slots 37 on the carriage 3 then move forward until the stop 36 is disengaged when the carriage continues its upward movement to top position. The slides 34 are ordinarily prevented from moving forward by the bevelled latch 38, supported on the spring arm 38a secured on the inside of one of the forwardly projecting arms 39 forming part of the frame of the carriage. The bevelled head of latch member 38 extends through the arm 39, and the channel 40 on one slide 34 abuts against it until it is depressed. When latch 38 is depressed however the slides 34 are free to move forward on the carriage. The stop member 36 is positioned in the vertical path of the latch 38, and upon contact with the latch depresses it permitting the slide 34 to move forward. As the slide 34 moves forward the end of stop 36 is engaged in channel 40 extending horizontally of the carriage and between the flanges 40a and 40b. Further upward movement of the carriage is prevented until the forward movement of the slide 34 frees the flange 40b of contact with stop 36.

The tabs 17 in each unit in the rack 16 extend into the pathway of the carriage 3 and are straddled by bifurcated lugs 18 on slides 34 while the carriage moves up and down, but lugs 18, as will be readily seen by reference to Figs. 2, 3, 4 and 5 will engage the tabs 17 when the slides 34 on the carriage move in a horizontal plane thereby withdrawing from rack 16 the particular storage unit the tabs 17 of which are between their bifurcations. The flanges 14 of a unit 2 slide into slots 41 on the side of platform 42 supported by the arms 39 of the carriage when a unit is moved from its place in rack 16 by the forward movement of the slides 34 in slots 37 in the carriage. The arms 39 may be joined together by a cross bar 39a.

*Control mechanism for tens and hundreds digits*

On the inside of the casing 1 a panel 9, capable of limited movement in a vertical plane, is supported. The stop members 36, attached to connecting members 36a controlled by the "hundreds digits" keys 8 are supported by the panel 9 and spaced apart a distance corresponding to the space occupied vertically by ten storage units 2. Also carried by panel 9 is a plunger 44 engageable in any one of ten channels 43 in bracket 43a, normally closed by stops 45 connected to the "tens digits" control keys 7 by connections 45a which occupy a space also equal to ten storage units, or the distance between the stops 36, and which are opened to receive plunger 44 by operation of the "tens digits" control key 7. The stops 36 limit the selection of the storage unit selector carriage to the ten units 2 containing the record cards of the particular hundreds group in which the desired card is located, and the particular channel 43 engaged by plunger 44 determines which unit 2 within the ten is the one to be engaged by the unit selector carriage 3 and carried to the top of the device. In the embodiment of the invention illustrated herein the selection of the "tens digit" of the desired card, i. e. the particular storage unit within a group of ten, takes place first, the panel 9 moving upwardly with the unit selecting carriage 3 by means of stud 60 until the plunger 44 engages the particular channel opened by operation of the appropriate "tens digits" control key 7, and the carriage 3 then continues upwardly until it contacts a stop 36, projected by operation of a "hundreds digits" key 8, which determines the desired "hundreds digits" i. e. the particular group of ten units within which the tens digits selection is to apply.

As illustrated in Figure 13 panel 9 is an elongated member having lateral flanges 46 in which slots 47 are formed, and is supported in casing 1 by pins 48 positioned in the slots 47 and fastened to the stationary frame. The panel may therefore be moved in a vertical plane a distance corresponding to the length of the slots 47. The panel may also be supported by means of springs 49, secured at their upper ends 49a to the frame and at their lower ends 49b to flanges 46, tending to lift the panel 9.

Extending through the panel at spaced intervals are the bore 50 in which the stops 36 are slidably seated. The stops 36 are attached to one end of connectors 36a which are contained within flexible tubes 36b, and at their other ends are respectively connected to and actuated by the "hundreds digits" keys 8 (Figs. 1 and 18).

Also extending laterally through panel 9 is a bore 51 in which is contained plunger 44 fastened to one end of a bell crank 53 pivotally supported on the bracket 54. The free end of crank 53 is pivotally connected at 53a to a rod 55, the other end of which is pivotally joined at 55a to the bifurcated latch member 56 which is pivoted to the member 9 at 57. A spring 58 may be provided connected between a lug 58a on the panel 9 and the lower arm of the bell crank 53 to aid in urging the plunger 44 into one of the ten channels 43 supported in a bracket 43a secured on the inside of the frame in position such that as panel 9 moves upwardly the channels 43 will successively be in alinement with, and in abutting relation to, the plunger 44.

The channels 43 are normally closed by slidable stops 45 seated therein and interconnected to the "tens digits" control keys 7 (see Figs. 1 and 19) by connections 45a supported in flexible tubes 45b. When a key 7 is depressed (Fig. 19) it rotates the pivoted arm 59 which pulls back the connecting member 45a with its stop 45 and thus opens a channel 43 to receive the plunger 44. The tension springs 59a on the arms 59 tend to return the keys 59 and to restore them to normal position for another operation.

In neutral position the bifurcated latch 56 is engaged with a stud 60 projecting from the side of the carriage 3. When the carriage is elevated the interengagement of stud 60 with the bifurcated member 56 causes the panel 9 also to move upwardly until the plunger 44 enters a channel 43 which has been opened by actuation of the control keys 7. The plunger 44 is urged into an open channel 43 by spring 58 and by the cam action exerted by projection 60 on the upper arm of the pivoted latch member 56. When the plunger 44 enters one of the channels 43 the movement of the crank 53 and rod 55 will permit the latch 56 to rotate on its pivot 57 thereby freeing the stud 60 and permitting the carriage 3 to continue its upward travel independently of the panel 9 until stopped by one of the control stops 36, placed in extended position at the beginning of the operation by depressing the appropriate key 8. Stop 36 contacts and depresses the bevelled latch 38 and is engaged in the channel 40 long enough to maintain sliding engagement with flange 40b until the slide 34 has completed its forward movement carrying with it the selected storage unit 2. The stop 36 then having passed beyond the rear end of flange 40b of the channel 40, and the storage unit 2 being entirely withdrawn from the rack 16, the carriage resumes its upward travel carrying the selected storage unit 2 to the position where the desired card 4 will be withdrawn.

Supported on each slide 34 is an inwardly extending arm 61 pivoted on the bifurcated lug 18 at 62 which extend in front of the selected unit 2 and prevent any cards 4 contained therein from being jarred out of their position therein. The arms 61 are raised at the end of the upward movement of the carriage 3 due to contact of the rearwardly extending portion 61a of the arms with lugs 63 positioned on the inside of the casing in the path of said pivoted members. When the carriage 3 has reached the top of its travel the cards 4 therefore are free to be withdrawn from the unit 2 as heretofore described.

Card selecting mechanism

At the top of the casing 1 a card selecting slide 5 moveable in a substantially horizontal plane, is provided with ten hook members 64 each having a downwardly extending finger 64a adapted to enter the hole 11 in the front margin of a card 4.

The slide 5 is urged to move forward by a weight 65 attached to its front end by flexible member 65a passing over pulleys 65b and 65c, but is held at the rear of its slideway with the fingers 64a above the front margin of the storage unit being raised by the carriage 3, by means of a dog 66 engaging a slot 67 in the slide 5.

Cooperating with the hook members 64 on the slide 5 are ten rods 72 slidingly supported in bearings 73 and 74 depending from the hood 75. Each of the rods 72 is connected to one of the "units digits" control keys 6, which are the same as keys 8 for the "hundreds digits" (see Figs. 1 and 18), by connecting members 72a, contained within the flexible sheath or tube 72b, and fastened to the lug 76 on the rod 72. Between the lower end of each control key 6 and the end of the tube 72b (see Fig. 18), supported in the frame member 77, is a spring 78 which is compressed when a key 6 is pushed down and therefore tends to return the key to its original or neutral position. The key 6 however is provided with a bevelled lug 79 which serves first to move a sliding plate 80 located just below the top 81 of the key board casing, against the action of a spring 82 attached at one end to the sliding plate 80 and at the other end to a guide bracket 83 straddling the sliding plate 80 and depending from the top 81 of the key board casing, and then engages the bottom of the sliding plate 80, thus preventing the control key 6, its connecting member 72a and rod 72 from returning to neutral position. The keys for the "hundreds digits" are similar to keys 6. The sliding plate 80 is illustrated in connection with keys 7 as well as with keys 6 and 8.

The front ends of rods 72 abut against the ends of the hook members 64 on the slide 5. Each of the hook members 64 is slideably mounted in a bearing lug 84 on the top of the slide 5 and is urged rearwardly by a spring 85 interposed between the upwardly extending portion of the hook member 64 and the lug 84, so that when a rod 72 is moved rearwardly by operation of a "units digit" control key 6, its abutting hook member 64 will also move rearwardly.

The rear ends of the rods 72 are provided with downwardly extending fingers 86 which normally are positioned directly above and in position to register with and enter the respective holes 12 along the rear margin of a storage unit 2 as it is brought to the top of the casing 1. When a rod 72 is moved rearwardly due to the operator having depressed one of the "units digit" control keys 6, its finger 86 will be moved out of registry with one of the holes 12 in the rear margin of the storage unit. The downwardly projecting fingers 64a on the hook members 64 abutting against the front ends of rods 72 are normally just in front of the front end of the selected storage unit 2 as it approaches its top position. When a hook member 64 moves rearwardly wits its abutting rod 72 the finger 64a moves into registry with the inner end of one of the recesses 13 along the front margin of the storage unit 2 and with the aperture 11 in the front margin of one of the cards 4 in the storage unit 2 and enters into the aperture 11 as the carriage 3 rises to its top position.

It will thus be seen that the operator depresses the "units digit" key 6 corresponding to the number of the desired card, causing the rod 72 with the finger 86, which would normally enter a hole 12 along the rear margin of a storage unit 2 and engage the hole 11a in the rear of the desired card, to move rearwardly out of registry with hole 11a and causing a hook member 64 to move rearwardly thus bringing a finger 64a into registry with the hole 11 in the front margin of the desired card.

When the carriage 3 has completed its upward travel all of the cards 4 in the storage unit 2 will be engaged and held in place by fingers 86 on the rods 72 except the desired card, which will be engaged by a finger 64a of one of the hook members 64 and therefore ready to be withdrawn from its storage unit as the slide 5 moves forward on the rollers 87 and 88 mounted in the guideways 89 and 90. The slide 5 will move forwardly upon release of the dog 66 from the slot 67 in the slide 5. The dog 66 is pivoted at 91 and has a rearwardly extending arm 92. It is released from the slot 67 when a lug 93 on the carriage 3 trips the arm 92 at the top of its upward movement.

As indicated in Figs. 1, 6 and 8 the slide 5 is mounted beneath a card supporting platform 100 having therein parallel slots 101 which are alined with the recesses 13 in the front margin of the storage unit 2. The hook members 64 on slide 5 extend upwardly through slots 101 in platform 100 and, after a finger 64a has engaged the hole 11 in the front of the desired card and slide 5 has been released from dog 66, these hooked members move forward in the slots 101 drawing the desired card out of its storage unit onto the platform 100 where it may be supported while any data is taken therefrom or any entries made upon the card.

The length of travel of the slide 5 is devised in relation to the width of the record card employed so that the card 4 will be substantially (but not entirely) withdrawn from its storage unit 2, so that all data thereon will be visible and any new data may be entered thereon, but the rear end of the card will not be beyond the front edge of the storage unit. This is done so that when the operator is through with the card and returns the slide 5 the withdrawn card will be guided back into its storage unit by the sides of the unit and will be in control at all times.

Return of card and storage unit

For the return of the withdrawn card the operator seizes the handle 102 on slide 5 and pushes the slide rearwardly thereby (as will be explained) reversing the drive of shaft 30 when the slide 5 has returned to the rear end of its travel at which time the withdrawn card will be completely returned to its former position in the storage unit 2. The reversal of drive shaft 30 causes the belts 19 to move in the opposite direction thereby lowering the storage unit selector carriage 3 until the stop member 36, again contacts the bevelled latch 38 depressing it and permitting the slide 34 on the carriage 3 to move rearwardly but preventing the carriage from resuming its downward travel until the carriage has moved rearwardly sufficiently to clear flange 40a from abutment against stop 36. When the unit has been completely returned to its original position the channel 40 and flange 40a on the slide 34 will have passed beyond the stop 36 so that the carriage 3 is free to continue its downward movement to its lowermost or neutral position. During this final movement of the carriage 3 the lug 60 carried by the carriage will enter the open end of the bifurcated latch member 56 causing the withdrawal of the plunger 44 from the tens digit channel 43, in which it was seated, permitting the panel 9 to move downwardly until the pins 48 are at the top of the slots 47, and causing the latch 56 to turn downwardly on its pivot 57 and again assume the position shown in Figure 13. The device is now ready for the next operation.

Withdrawing record card entirely from its storage unit

If it is desired to fully withdraw a card from its storage unit this may be accomplished in the following manner. The operator pulls a stop handle 103 thereby withdrawing the stop 104 from the upper guide way 89 and permitting the rollers 87 on the rear of the slide to travel up the inclined extension 89a of the guide way 89 thereby tilting upwardly the rear end of the slide and thereby withdrawing the finger 64a on the hook 64 engaged with the hole 11 of the withdrawn record card. In moving forwardly the lower slide roller 88 runs over the pivoted cam member 105 thereby rotating said member downwardly about its pivot 106 and causing it through the link 107 and rod 108 to rotate a cam member 109 pivoted at 110 on each side, causing said member to raise the entire hood section 75, including the bearing members 73 and 74 which support the rods 72, thereby raising all of the fingers 86 of the rods 72 from engagement with the holes 11a in the rear margins of the respective nine cards not withdrawn. Raising hood 75 also raises an arm 111 connected at one end to the hood at 112 and having its free end bent so as to extend into the eye 113 on the sliding plate 80 for the keys 6, moving the slide plate 80 sufficiently to release all of the depressed keys 6 thereby permitting the rod 72, which had previously been moved rearwardly, to resume its neutral position. When the hood 75 is raised it is guided by the pins 114 on the inside of the casing 1 engaged in slots 115 in the sides of the hood and is pivoted rearwardly thus causing the bent end of arm 111, through engagement with eye 113 to move plate 80 rearwardly.

When a record card has been wholly withdrawn it is returned to its storage unit by hand. It will be noted that it is not necessary to return the card to its original order within the ten cards within the storage unit but it may be inserted on the top of the other cards.

The purpose of returning the member 72 to its original position is to prevent injury to the normally replaced card upon the reverse movement of the slide 5. Otherwise the finger 64a on the slide 5 which had previously been engaged in the hole 11 of the selected card would strike against the front edge of the said card thereby tending to injure the edge of the card between the hole 11 and the edge of the card.

When the slide is moved rearwardly from its extreme forward position the slide roller 88 moves off the cam 105 thereby permitting it to rotate on its pivot 106 and allowing the hood 75 to close due to its own weight.

Starting and stopping mechanism

When beginning the operation of the device the operator first throws a switch (not shown) to start the motor 31. He then depresses the keys corresponding to the units, tens and hundreds digits of the number of the desired card, and connects the motor by depressing the button 116, on the control rod 117, which in turn rotates arm 118 pivoted at 118a thereby engaging the clutch member 119 with the drive shaft 30 on which worm gear 29 is mounted thereby rotating the pulley 27 and belt 19 causing the storage unit selecting carriage 3 to start upwardly.

When the unit storage selecting carriage 3 reaches the top of its upward travel the lug 130 on the inside of the carriage 3 contacts with the stop 131 on rod 117 thereby raising rod 117 and throwing clutch member 119 into neutral position. The desired card is then withdrawn from its storage unit as has been explained.

The card is returned to its storage unit by the operator seizing the handle 102 and pushing it rearwardly against the action of weight 65. The handle 102 has a lateral extension 132, which extends below the card supporting platform 100 and supports the arm 134 pivoted at 135, which is alined with the stop 136 fixed on arm 117. The end of the arm 134 is bevelled at 137 as shown in Figure 23. A stop 138 is provided on the bracket 132 so that the pivoted arm 134 may swing out of the path of the starting lug 136 when the card selecting carriage is moved forwardly, but is held rigid when the slide 5 is moved rearwardly. A spring 139 may be provided to hold the arm 134 normally in operative position to engage the starting lug 136. When the arm 134 contacts the starting lug 136 as it passes beneath said lug it raises the latter thereby raising rod 117 and engaging the clutch 119 in reverse and starting the storage unit carriage 3 downwardly.

When the carriage 3 has returned the storage unit to its former position and has reached its neutral position the lug 130 on the storage unit carriage will contact the lug 140 on rod 117 and disengage the clutch from the reverse drive, thereby returning the apparatus to neutral when the operator may cause a new card to be selected by again depressing the proper control keys and the operating button 116.

When the operator is placing a record in a storage unit 2 by hand, as may occur when a card has been entirely removed from its storage unit or when a new card is being originally placed in the storage unit it is convenient to have the front portion of the top of the storage unit hinged as shown at 150 to provide a wider opening in which to insert the card. So that the hinged portion 150 of the top of the storage unit 2 will be automatically raised whenever the slide 5 is moved to its extreme forward position, spring arms 151 are provided suspended from the hood portion 75 in position to be struck and separated by the flanges 152 on the lateral edges of the hinged portion 150 of the top of the storage unit. The spring arms 151 have bevelled projections 151a which engage under the edge of the projections 152, as the spring arms move together after being separated by projections 152 as the carriage 3 rises to top position, and thereby lift the hinged portion 150 when the hood 75 carrying the spring arms 151 is raised.

The hinged portion 150 will remain in elevated position until the operator has inserted the card in its storage unit and moves slide 5 toward its rear position thereby permitting the hood 75 to resume its closed position. When the storage unit, and carriage 3 move downwardly the yielding spring arms 151 will again move outwardly, permitting the flanges 152 to slip over the bevelled projection 151a and thus offering no appreciable resistance to the return of the storage unit to its place in the rack 16.

What I claim is:

1. A device for storing and automatically selecting a desired record comprising a number of separate record storage units, means for selecting and removing one of said units from the other storage units, means for automatically selecting and withdrawing from said removed unit one of the records contains therein, and control means for said selecting and removing means and said withdrawing means.

2. A device for storing and automatically selecting a desired record comprising a number of record storage units, means for selecting one of said units and for removing it from the other units and thereafter returning it to its original position, means for automatically selecting and withdrawing from said unit one of the records contained therein, and control means for said unit selecting and removing means and for said record-selecting means.

3. In a device comprising a number of record storage units each containing a number of records, means positioned at a distance from said storage units operable upon contact with one of said units to select and withdraw the desired record therefrom, means for selecting predetermined units one at a time and moving them into operable contact with said record-selecting and withdrawing means, means for actuating said storage unit selecting means and means for reversing said selector actuating means to return the selected storage unit.

4. A device for storing and selecting a desired record comprising a number of record storage units, means located at a distance from the stored units operably engageable with each of said units to select and withdraw a desired record therefrom, means for engaging a predetermined one of said storage units and for moving it out of its position into operative contact with said record-selecting and withdrawing means, means for actuating said engaging and moving means, and control means for said engaging and moving means.

5. A device for storing and automatically selecting a desired record card comprising a number of record files each adapted to contain a number of record cards, means for selecting and removing from the other files the file in which a desired record card is filed, and means operable after removal of the file for substantially withdrawing the desired record card from its file.

6. A device for storing and automatically selecting a desired record comprising a cabinet having therein a number of separate record files each adapted to contain a number of record cards means located at a distance from said stored records, adapted to engage the records of any one of the files and to select and withdraw a desired record, a carriage moveably mounted in said cabinet and adapted to engage one of said files and remove it into operable contact with said record-engaging and withdrawing means, means for actuating said carriage, means for directing said carriage into engagement with the file having therein a desired record card, and a number of selector keys having connections with said directing means.

7. A device for storing and automatically selecting a desired record comprising a cabinet having therein a number of record files each adapted to contain a number of record cards, a carriage movably mounted in said cabinet and adapted to engage one of said files and remove it to a predetermined position, means for actuating said carriage, means for directing said carriage into engagement with the file having therein a desired record card, and a number of selector keys having connections with said directing means, means for selecting the desired record and substantially removing it from its file, means for returning the file to its original position, after the card is replaced in its file and other selector keys connected to said record selecting and removing means.

8. A device for storing and automatically selecting a desired card comprising a cabinet having therein a number of record files each adapted to contain a number of record cards, a moveable support adapted to engage one of said files and move it to a predetermined position, cooperating interengaging means on said moveable support and on each of said files, means for limiting the direction and extent of movement of said moveable support, means for actuating said moveable support, means for controlling said limiting means, means for selecting and removing a desired card from a file supported on said support, and means for controlling said selecting and removing means.

9. A device for storing a number of record cards contained in separate containers and, upon the actuation of control keys, for mechanically selecting a desired container and bringing it to a predetermined position, comprising a number of record card containers arranged in predetermined relation, a carrier for said containers moveably mounted on supporting means, a slide on said carrier moveable relatively to said carrier, means for actuating said carrier and said slide, stop means for limiting the movement of said carrier within the range of its movement until said slide has been moved relatively to said carrier, control means for said limiting means, and means on said slide inter-engageable with means on each of said containers, individual engaging means whereby a predetermined card in a container may be engaged, and means for moving said engaging means away from said carrier thereby withdrawing a card from a container supported on said carrier.

10. A device for storing and automatically selecting a desired card comprising a cabinet having therein a number of record files, each adapted to contain a number of record cards, a moveable carriage having thereon slideable means engageable with any one of said files to move it onto said carriage, means for actuating said carriage and slideable means to engage a desired file and to move it onto said carriage and carry it to a predetermined position, and a card-withdrawing slide having fingers equal in number to the cards in the file, each of said record cards having an aperture adapted to receive one of said fingers and cut out portions extending inwardly from the edge of the card equal in number to the remainder of said fingers, means for causing said slide to move away from the said file thus withdrawing the desired card as soon as one of said fingers has entered the said aperture in the desired card, and control means for initially setting said fingers to engage a predetermined card.

11. In a device for storing a number of serially identified cards and for selecting and presenting any one of said cards, the combination of a cabinet, a number of serially identified record cards, a number of separate containers for said cards positioned in said cabinet, an elevator moveable within said cabinet, said elevator having thereon slideable means adapted to engage one of said containers and to move it onto said elevator, control keys relating to the serial identification of said cards, stops having connections to said control keys adapted to stop and hold said elevator at a point determined by the setting of the control keys until the said slide has engaged a predetermined container and moved it onto said elevator, and means fixed to said slide for actuating said elevator and for moving said slide relatively to said elevator.

12. In a device for storing a number of serially identified cards and for selecting and presenting any one of said cards, the combination of a cabinet, a number of serially identified record cards, a number of separate containers for said cards positioned in said cabinet, an elevator moveable within said cabinet, said elevator having thereon slideable means adapted to engage one of said containers and to move it onto said elevator, control keys relating to the serial identification of said cards, stops having connections to said control keys adapted to stop and hold said elevator at a point determined by the setting of the control keys until the said slide has engaged a predetermined container and moved it onto said elevator, means fixed to said slide for actuating said elevator and for moving said slide relatively to said elevator, a number of fingers supported in the cabinet each adapted to engage an aperture in one of said cards, control means for initially positioning said fingers and means to move said fingers relatively to said selected container to withdraw the engaged card from said container.

13. In a device for storing a number of serially identified cards and for selecting and presenting any one of said cards, the combination of a cabinet, a number of serially identified record cards, a number of separate containers for said cards positioned in said cabinet, an elevator moveable within said cabinet, said elevator having thereon slideable means adapted to engage one of said containers and to move it onto said elevator, control keys relating to the serial identification of said cards, stops having connections to said control keys adapted to stop and hold said elevator at a point determined by the setting of the control keys until the said slide means has engaged a predetermined container and moved it onto said elevator, means fixed to said slide means for actuating said elevator and for moving said slide means relatively to said elevator, a number of fingers supported in the cabinet each adapted to engage an aperture in one of said cards, control means for initially positioning said fingers, means to move said fingers relatively to said selected container to withdraw the engaged card from said container, and means for holding the remaining cards in the container while the desired card is being withdrawn.

14. In a device for storing a number of serially identified cards and for selecting and presenting any one of said cards, the combination of a cabinet, a number of card storage units removeably supported in the cabinet, a number of serially identified cards each having a hole spaced from its front edge and a hole spaced from its rear edge, contained in said storage units, each of the storage units for said cards being open at its front edge but cut away to expose the said holes along the front edges of the cards, and having holes extending through it along its rear edge, each of said holes being arranged in vertical alinement with a hole adjacent the rear edge of one of said cards and means for engaging the holes in said cards to remove a desired one of said cards from a selected storage unit, and to prevent removal of the remainder of the cards therefrom.

15. In a device for storing a number of serially identified cards and for selecting and presenting any one of said cards, the combination of, a casing, a number of containers for said cards stored within the casing, means for engaging and holding in a selected container all but one of said cards, and means for engaging and withdrawing one of said cards, control keys for identifying a desired card and connections between said engaging and holding means and said control keys, and means for selecting the container having therein a desired card and for bringing it into operable contact with said card-holding and card-withdrawing means.

16. In a device for storing a number of cards and for selecting and presenting any one of said cards, a frame, a number of storage units for cards, a carrier for said units moveable in said frame, a slide on the carrier engageable with any one of said storage units and capable of moving one of said units onto or off said carrier, means for stopping the carrier at a predetermined storage unit and holding it until the said unit is engaged and moved by said slide onto the carrier, means for actuating the carrier and slide, and means actuated by said carrier for withdrawing a card from the storage unit supported on said carrier.

17. In a device for storing a number of cards and for selecting and presenting any one of said cards, a frame, a number of storage units for cards, a carrier moveable in said frame, a slide on the carrier engageable with any one of said storage units and capable of moving a unit onto or off said carrier, means for stopping the carrier at a predetermined storage unit and holding it until the said unit is engaged and moved by said slide onto or off the carrier, means for actuating the carrier and the slide thereon, means located at a predetermined position with respect to said carrier adapted to engage and withdraw one card from a container while supported on said carrier and other means to prevent the withdrawal of more than one card.

18. In a device for storing a number of cards and for selecting and presenting any one of said cards, a frame, a number of card storage units therein, a carrier moveable in said frame, a slide on the carrier having means engageable with any one of said storage units and capable of moving one of said units onto or off said carrier, means for stopping the carrier in alinement with a predetermined storage unit until the said unit is engaged and moved onto or off the carrier by said slide, means located at a predetermined position with respect to said carrier adapted to engage and withdraw one card from a container while supported on said carrier, other means to prevent the withdrawal by said card withdrawing means of more than one card, a number of control keys, connections between some of said keys and the carrier stopping means, connections between other of said keys and the means for preventing the withdrawal of said cards, and means connected to the slide on said carrier for moving said carrier and said slide.

19. A device for storing serially-identified cards and for automatically selecting one of a number of card containers and a desired card from its container, comprising a number of card containers, a number of cards in said containers, control keys by which any desired container may be indicated in advance, means for engaging a desired container and moving it to a predetermined position, means for actuating said engaging and moving means, means connected to said control keys for controlling the said engaging and moving means, and means operable when the selected container reaches said predetermined position for selecting and removing a card from the container.

20. A device for storing and selecting cards, comprising a number of storage units, means for selecting and removing a storage unit containing a desired card, a number of cards in said removed unit each having means engageable by card selecting means, a card-selecting member having means to engage any of said cards, and control means for positioning said card-engaging means in advance to engage the desired cards.

21. A device for storing and selecting cards, comprising a number of storage units, means for selecting and removing a storage unit containing a desired card, a number of cards in said removed unit each having means engageable by card-selecting means, a card-selecting member having means to engage any of said cards, control means for positioning said card-engaging means in advance to engage the desired card, and means operable upon said engagement for moving said card-selecting member relatively to the selected storage unit to withdraw the engaged card.

22. A device for storing and selecting cards, comprising a number of storage units, means for selecting and removing from the remaining units a storage unit containing a desired card, actuating means therefor, a number of cards in said removed unit each having means engageable by card selecting means, a card-selecting member having means to engage any of said cards, control means for positioning said card-engaging means in advance to engage the desired card, means operable upon said engagement for moving said card-selecting member relatively to the selected storage unit to withdraw the engaged card, and means operable upon the return of the selected card to its container to reverse the actuating means for said unit selecting and removing means thereby causing the removed storage unit to be returned to its original position.

23. A filing and record selecting apparatus comprising a cabinet, a number of separate record storage units therein, unitary means for selecting desired units and removing them one at a time from the other units to a position in front of the operator and for returning them to their original positions, reversible actuating means for said selecting and moving means, and control keys operatively connected to said selecting and moving means.

24. A filing and record selecting apparatus comprising a cabinet, a number of separate independent storage units each having an open end stored therein, means for selecting desired units one at a time and withdrawing the desired unit from other units and presenting it in front of the operator with the open end pointing toward the operator, and for returning the storage unit to its original position, actuating means for said selecting-withdrawing-returning means, and control means for both the aforesaid means.

25. A filing apparatus comprising a cabinet, a number of separately movable storage units each having an open end disposed therein, means for selecting a desired unit and presenting it in a horizontal position in front of the operator with the open end toward the operator, and for returning the storage unit to its original position, actuating means for said selecting and moving means, and control means for said actuating and selecting means.

26. A filing apparatus comprising a number of record storage units, each adapted to store a number of records, means for selecting one of said units and for bringing it into operative contact with record selecting means without moving the other units, means for selecting and withdrawing from said unit one of the records contained therein, means for returning the withdrawn record to its storage unit, and control means for said unit selecting means and for said record selecting means.

27. A filing apparatus comprising a number of record files each adapted to contain a number of record cards, means for selecting a file in which a desired record card is contained and for bringing the file into operative contact with means operably engageable with each of the record cards contained in said file without moving any of the other files, means operably engageable with each of said cards to select and substantially withdraw from the file a desired record, means for returning the record card to its file, and actuating and control means for said selecting and removing means.

28. A device for storing serially-identified cards and for automatically selecting one of a number of card containers and a desired card from its container, comprising a number of card containers, a number of cards in each of said containers, control keys by which any desired container may be indicated in advance, means for engaging any desired container and moving it to a record withdrawing station without moving the other containers, means for thereafter returning the selected and withdrawn container to it original position, means for actuating said engaging and moving means, means connected to said control keys for controlling the said engaging and moving means, and means operable when the selected container reaches said record withdrawing station for selecting and removing a card from the container.

29. A device for storing serially-identified cards and for automatically selecting one of a number of card containers and a desired card from its container, comprising a number of card containers, a number of cards in said containers, control keys by which any desired container may be indicated in advance, means for engaging a desired container and moving it to a predetermined position without moving any of the other containers, means for actuating said engaging and moving means, means connected to said control keys for controlling the said engaging and moving means, and means operable when the selected container reaches said predetermined position for selecting and removing a card from the container and for retaining hold of said card and guiding it back into its container.

30. Apparatus for filing records and for selecting and presenting them to an operator so that he may inspect them or make an entry thereon comprising, a cabinet, a number of containers in the cabinet, a station convenient to the operator to which any of the containers may be brought, a carrier movably mounted in the cabinet so that it may be reciprocated between any of said containers and said station, means on the carrier movable relatively to the carrier and having means to engage any of said containers, means for actuating said carrier, means for arresting the carrier in alinement with the desired container until said relatively movable means has been moved relatively to the carrier, and control means for said arresting means.

31. A filing and record selecting apparatus comprising a number of record containers separately mounted therein, a number of record cards insertable in any one of said containers, each card having means engageable by card selecting means, a card selecting member, means for bringing a container into operative contact with said card selecting member so that the cards in the container are in horizontal position, control means for positioning said card engaging member in advance to engage a desired card, and means for moving said card selecting member relative to said container, after it has engaged a desired card, to withdraw the card from the container so that it may be conveniently inspected or an entry made thereon by the operator.

32. In a filing and record selecting apparatus comprising a cabinet and a number of records contained in separate storage units therein, means for selecting one of the desired units and moving it from the others to a predetermined horizontal position in front of the operator, means for withdrawing a desired card from said storage unit and presenting it horizontally before the operator so that it may be conveniently inspected or an entry made thereon by the operator, means for returning the card to its original position within the storage unit, actuating means for said card selecting, and said card withdrawing and presenting means, and control means for said actuating means.

FRANCIS FELIX CLAUDE RIPPON.